United States Patent
Gassmann et al.

(10) Patent No.: US 12,510,148 B2
(45) Date of Patent: Dec. 30, 2025

(54) ELECTRIC DRIVE FOR A VEHICLE

(71) Applicant: GKN Automotive Limited, Birmingham (GB)

(72) Inventors: Theodor Gassmann, Siegburg (DE); John Foulsham, Hampshire (GB)

(73) Assignee: GKN Automotive Limited, Birmingham (GB)

( * ) Notice: Subject to any disclaimer, the term of this patent is extended or adjusted under 35 U.S.C. 154(b) by 243 days.

(21) Appl. No.: 18/570,098

(22) PCT Filed: Jul. 30, 2021

(86) PCT No.: PCT/EP2021/071460
§ 371 (c)(1),
(2) Date: Dec. 14, 2023

(87) PCT Pub. No.: WO2023/006221
PCT Pub. Date: Feb. 2, 2023

(65) Prior Publication Data
US 2024/0271694 A1    Aug. 15, 2024

(51) Int. Cl.
*H02K 7/116* (2006.01)
*F16H 57/04* (2010.01)
(Continued)

(52) U.S. Cl.
CPC ..... *F16H 57/0476* (2013.01); *F16H 57/0413* (2013.01); *H02K 7/116* (2013.01); *H02K 9/193* (2013.01); *H02K 9/197* (2013.01)

(58) Field of Classification Search
CPC ........ H02K 7/116; H02K 9/193; H02K 9/197; H02K 9/12
(Continued)

(56) References Cited

U.S. PATENT DOCUMENTS 6,329,731 B1    12/2001    Arbanas et al.
8,851,861 B2    10/2014    Frait et al.
(Continued)

FOREIGN PATENT DOCUMENTS

CN    103419622 A    12/2013
DE    102011118574 A1    5/2013
(Continued)

OTHER PUBLICATIONS

JP Office Action for JP Application No. 2024-505387 dated Jan. 28, 2025 (10 pages).
(Continued)

*Primary Examiner* — Jose A Gonzalez Quinones
(74) *Attorney, Agent, or Firm* — Reising Ethington P.C.

(57) ABSTRACT

An electric drive for a vehicle comprises: an electric machine, a stator connected to a housing and comprising stator end-windings, a rotor rotatable relative to the stator, and a driveshaft connected to the rotor; a transmission to transmit a rotary movement from the driveshaft to a driveline; a sump containing fluid to cool and/or lubricate the electric machine and the transmission; a hydraulic arrangement comprising at least one bi-directional pump, a first suction line hydraulically connected with the pump, a stator path for cooling the stator, a second suction line connected with the pump, and a transmission path for cooling the transmission; a valve arrangement with multiple valves configured such that fluid is either supplied from the sump through the first suction line to the stator path, or through the second suction line to the transmission path.

16 Claims, 7 Drawing Sheets

(51) Int. Cl.
*H02K 9/193* (2006.01)
*H02K 9/197* (2006.01)

(58) Field of Classification Search
USPC .................................. 310/52, 54, 58, 59, 62
See application file for complete search history.

(56) References Cited

U.S. PATENT DOCUMENTS

| | | |
|---|---|---|
| 10,138,995 B2 | 11/2018 | Herkommer et al. |
| 10,622,869 B2 | 4/2020 | Kiyokami et al. |
| 2013/0192949 A1 | 8/2013 | Frait et al. |
| 2017/0285062 A1 | 10/2017 | Kim |
| 2017/0313273 A1 | 11/2017 | Kim et al. |
| 2019/0081537 A1 | 3/2019 | Kiyokami et al. |
| 2019/0229582 A1 | 7/2019 | Ito et al. |

FOREIGN PATENT DOCUMENTS

| | | | | |
|---|---|---|---|---|
| DE | 102013214758 A1 | * | 1/2015 | ............... B60K 6/48 |
| DE | 102016211226 B3 | * | 6/2017 | ......... F16H 57/0441 |
| DE | 102019128957 A1 | * | 4/2021 | ............ F16H 57/045 |
| EP | 3627004 A1 | * | 3/2020 | ......... F16H 61/0021 |
| JP | 2001065647 A | | 3/2001 | |
| JP | 2016536533 A | | 11/2016 | |
| JP | 2019048549 A | | 3/2019 | |
| WO | 2015058788 A1 | | 4/2015 | |
| WO | WO2019194070 A1 | | 10/2019 | |
| WO | 2020069744 A1 | | 4/2020 | |
| WO | WO-2020067259 A1 | * | 4/2020 | ............. F16H 57/04 |

OTHER PUBLICATIONS

International Search Report and Written Opinion for PCT/EP2021/071460 mailed Apr. 8, 2022 (11 pages).

* cited by examiner

| P1 | P2 | CS | MD | OP |
|---|---|---|---|---|
| 0 | 0 | C0 | Ms | Olp |
| rd1 | rd1 | Cm | Mt | Ol |
| rd2 | rd1 | Cmed | Mmed | Omed |
| rd2 | rd2 (0) | Ct | Mv | Ov |

Fig. 5

ELECTRIC DRIVE FOR A VEHICLE

CROSS-REFERENCE TO RELATED APPLICATIONS

This application is a national stage of, and claims priority to, Patent Cooperation Treaty Application No. PCT/EP2021/071460, filed on Jul. 30, 2021, which application is hereby incorporated herein by reference in its entirety.

BACKGROUND

From US 2019/0229582 A1, a vehicle drive device is known with a lubricating path including a first oil pump to pump oil stored in a casing of a power transmission mechanism for lubricating same, and a cooling path that is separated from the lubricating path and provided for a rotating electric machine. The cooling path includes a second oil pump to pump oil stored in the casing exclusively to the rotating electric machine and for cooling same. The second oil pump is an electric pump, and the cooling path is provided with an oil cooler for cooling the oil supplied to the electric machine.

Document US 2017 0285062 A1 discloses an electric oil pump control method for operating a transmission of a hybrid vehicle which is driven by a first motor, a second motor, and an engine. The method includes determining a number of revolutions of a low-pressure pump of an electric oil pump based on lubrication flow amount of the first motor, lubrication flow amount of the second motor, cooling flow amount of the first motor, and cooling flow amount of the second motor, and determining a number of revolutions of a high-pressure pump of the electric oil pump based on a control flow amount of a clutch of the transmission and a lubrication flow amount of a rotation driver included in the transmission.

From US 2019 0081537 A1, a cooling system for a rotary electric machine is known for driving a vehicle. The cooling system includes a first pump, to be driven accompanying with running of the vehicle to supply lubricant to the rotary electric machine, and a second pump driven by a second drive source to supply the lubricant to the rotary electric machine. The first pump is configured to supply the lubricant, through a first passage, to an inside of a rotary shaft of a rotor core of the rotary electric machine. The second pump is configured to supply the lubricant, through a second passage, to a coil of a stator of the rotary electric machine.

From WO 2020 069744 A1, an electric drive for driving a motor vehicle is known with a housing arrangement, an electric machine, a planetary unit, and a power transmission unit. The housing arrangement has a first housing part on the motor side, a second housing part on the transmission side, and an intermediate housing part which separates a motor space and a transmission space from each other. The intermediate housing member has a motor-side casing portion extending axially into the outer casing portion of the first housing member, and a transmission-side casing portion extending axially into the second housing member. A sealed cavity for a coolant to flow through is formed between the outer surface of the motor-side casing portion and the inner surface of the first housing part.

Document WO 2015 058788 A1 discloses a drive assembly for a motor vehicle with a first gear and a second gear drivingly connected to one another, and a lubricant filling which, in a static built-in condition of the drive assembly, defines a lubricant level. A first reservoir is arranged above the lubricant level which can be filled with lubricant as a result of the rotation of the first gear. A second reservoir is arranged above the lubricant level which can be filled with lubricant as a result of the rotation of the second gear. The first reservoir serves to lubricate a first bearing region, whereas the second reservoir serves to lubricate a second bearing region of the drive assembly.

SUMMARY

Described herein is an electric drive assembly for a vehicle with an electric machine, a transmission and a hydraulic arrangement to cool and/or lubricate the electric machine and the transmission.

The electric machine and the transmission of the electric drive for the vehicle have different cooling and lubrication requirements, which depend on operation conditions. A performance of the electric machine is thermally limited in operation. Inherent losses may occur in the copper, iron and magnets of electric motors, where material properties limit the temperatures of the respective components and structures. Effective cooling is necessary to achieve adequate torque performance. A passive splash lubrication of the transmission may result in churning losses under high-speed operation. The combination of cooling and lubrication for both the electric machine and the transmission is a compromise with regard to efficiency. Using a common controlled pump for a transmission and an electric motor allows on demand lubrication and cooling, but is a compromise between the needs of the electric motor and the transmission.

Described herein is an electric drive for a vehicle with a hydraulic circuit for circulating a fluid for efficient cooling and lubrication of the electric machine and the transmission.

An electric drive for a vehicle is provided, comprising: a housing; an electric machine with a stator connected to the housing and comprising stator end-windings, a rotor rotatable relative to the stator, and a driveshaft connected to the rotor in a rotationally fixed manner, wherein the driveshaft is rotatably supported in the motor housing about an axis of rotation; a transmission to transmit a rotary movement from the driveshaft to drive a driveline of the motor vehicle; a sump in which fluid is contained for cooling and/or lubricating at least one of the electric machine and the transmission; a hydraulic arrangement comprising at least one bi-directional pump, a first suction line arranged between the sump and the pump, a stator path hydraulically connecting the pump with the electric machine to supply fluid for cooling the stator, a second suction line arranged between the sump and the pump, and a transmission path hydraulically connecting the pump with the transmission to supply fluid for cooling the transmission; and a valve arrangement with multiple valves configured such that, depending on the direction of rotation of the bi-directional pump fluid is either supplied from the sump through the first suction line to the stator path to cool the electric machine, or fluid is supplied from the sump through the second suction line to the transmission path to cool the transmission.

The electric drive provides an adaptive cooling and lubrication system which allows supply of an appropriate amount of fluid to the electric machine and the transmission in order to achieve a good performance and efficiency with low complexity and power consumption. The operation of the electric machine defines how much and where cooling is required, which can be controlled accordingly by the hydraulic arrangement. The described electric drive can be operated in several different cooling regimes so as to achieve good cooling and/or lubrication according to the needs.

As far as it is described in the present disclosure that the electric machine or the transmission is cooled, it is understood that this relates to a mainly/active cooling of said component, wherein the other component not mentioned can be indirectly/passively cooled. Furthermore, as far as the present disclosure generally refers to fluid, it is understood that this can be any fluid suitable to cool and/or lubricate the described components, in particular parts of the electric machine and/or parts of the transmission. For example, an oil can be used as coolant/lubricant for the electric drive.

The electric drive may include a bi-directional single or double pump arrangement in combination with a single or double sump and cooling system. A bi-directional operation allows two different lubrication cooling regimes especially configured for low speed/high torque and high speed/low torque operation of the electric machine. A bi-directional pump can be electrically driven, for example, wherein a load dependent fluid flow may be achieved by controlling the speed of the respective pump. In a low speed/high torque mode of the electric machine, the pump can be driven in a first rotational direction. In this mode the pump feeds fluid from the sump mainly into the stator and winding heads of the electric machine. In a high speed/low torque operation of the electric machine, the pump can be driven in the opposite rotational direction. In this mode the pump feeds fluid from the sump mainly into the stator and rotor of the electric machine to cool the magnets and the lamination. By combining a low pressure/high flow first bi-directional pump with a high pressure/low flow second bidirectional pump, the lubrication cooling system can be split in a low pressure high flow circuit (for example with stator, rotor cooling; transmission lubrication) and a high pressure/low flow circuit (for example with spray cooling of the end-winding, spray lubrication of the gears at high speed operation). This will allow even more sophisticated and effective cooling/lubrication concepts.

In the following, some further specifications and examples are described in greater detail. In this connection, it is understood that any description of one component may also be applied to a further respective component, for example any technical feature described in connection with one pump, sump, valve or other component may also be applied to any other pump, sump, valve or component respectively.

The valve arrangement is configured to control the fluid flow depending on the direction of rotation of the respective pump. The valve arrangement may comprise a check valve arranged in the first suction line, a check valve arranged in the second suction line, a check valve arranged in a first pressure line that is part of the transmission path, and/or a check valve arranged in a second pressure line that is part of the stator path. The first suction line can be connected to a first inlet, and the second suction line can be connected to a second inlet of the pump. A fluid supply line can be provided to hydraulically connect the sump with the first and second suction line. A suction filter can be arranged upstream of the pump in the fluid supply line, for example. A heat exchanger may be arranged downstream of the pump, for example in the stator path.

According to an embodiment, the hydraulic arrangement can comprise a first and a second bi-directional pump that can be arranged functionally in parallel to each other between the sump at the suction side, and the electric machine and the transmission at the pressure side. In such an arrangement with two bi-directional pumps, the hydraulic arrangement may be controllable such that in a low speed mode both the first and the second bi-directional pump are driven so as to supply fluid from the sump to the stator path for cooling the electric machine. In a medium speed mode, one of the two bi-directional pumps may be driven to supply fluid from the sump to the stator path, whereas the other one of the two pumps is driven to supply fluid from the sump to the transmission path. In a high speed mode both bi-directional pumps can be driven to supply fluid from the sump to the transmission path.

As mentioned above, the sump can comprise one single sump for both the electric machine and the transmission with a single connection to the pump(s) or, as an alternative, two separate sumps, i.e., a motor-side reservoir associated with the electric machine and a transmission-side reservoir associated with the transmission with separate connections to the pump(s). Fluid splashing or dripping from any rotating component of the electric drive during operation can be temporarily stored in the sump. From here, the fluid can be circulated again by a rotating component or the at least one pump supplying fluid from the sump to the location to be cooled and/or lubricated according to the requirements.

In an embodiment (FIGS. 1A-1D, 2) with two bi-directional pumps and one single sump in which fluid of the electric machine and the transmission can be stored, the respective first suction lines and second suction lines of both bi-directional pumps are hydraulically connected with the joint sump. Thus, only one sump line is connected with the joint sump.

In an embodiment (FIGS. 3A-3C) with two bi-directional pumps and a sump with two reservoirs, i.e., a motor-side reservoir and a transmission-side reservoir, the first suction lines of both bi-directional pumps can be hydraulically connected with the motor-side reservoir, and the second suction lines of both bi-directional pumps can be hydraulically connected with the transmission. More particularly, a motor sump line can be hydraulically connected with a first suction line/suction side inlet of the first bi-directional pump and with a first suction line/suction side inlet of the second bi-directional pump. Accordingly, a transmission sump line can be hydraulically connected with the second suction line/second suction side inlet of the first bi-directional pump and with the second suction line/second suction side inlet of the second bi-directional pump.

In a low speed/high torque mode (FIG. 3B), both pumps can be driven to feed fluid from the motor-side reservoir mainly to the stator and/or winding heads of the electric machine. Taking the fluid from the motor reservoir can lead to an increased fluid level in the transmission reservoir, allowing more plunging of the transmission. In this mode the transmission is operating with passive lubrication. In medium speed/medium torque mode (FIG. 3C), the two pumps may operate functionally opposite to each other, i.e., with one of the pumps sucking fluid from the transmission reservoir and feeding same mainly to the transmission for cooling same, and the other one of the pumps sucking fluid from the motor reservoir and feeding same mainly to the stator and/or rotor of the electric machine for cooling same. Taking fluid from the transmission reservoir can reduce the fluid level in this reservoir, hence the plunging of the gears can be reduced. In this mode the transmission is actively lubricated to reduce churning losses for high efficiency. In a high speed/low torque mode (FIG. 3D), both pumps can be driven so as to feed fluid from the transmission reservoir mainly to one or more portions of the transmission. Taking the fluid of both pumps from the transmission reservoir may lead to a reduced fluid level in the transmission reservoir, thus achieving little plunging and thus only little losses of the transmission.

In an embodiment (FIGS. 4A-4D) with only one single bi-directional pump and two reservoirs, i.e., a motor-side reservoir and a transmission-side reservoir, the first suction line of the bi-directional pump can be hydraulically connected with the motor-side reservoir and the second suction line of the bi-directional pump can be hydraulically connected with the transmission reservoir. In this case, the hydraulic arrangement can be controlled such that in a low speed mode (FIG. 4B) the bi-directional pump is driven so as to supply fluid from the motor-side reservoir to the stator path for cooling the electric machine, and in a high speed mode (FIG. 4C) the bi-directional pump is driven so as to supply fluid from the transmission-side reservoir to the transmission path for cooling the transmission.

In an implementation applicable for any of the above described embodiments, the hydraulic transmission path may comprise a branch conduit to an inner longitudinal bore of the driveshaft. As the active lubrication of the transmission does not require high-pressure fluid supply, in the high speed mode, the electric machine can be supplied with low-pressure coolant fluid via the driveshaft. The electric machine can be supplied with fluid in the high speed mode via radial bores of the driveshaft connecting the longitudinal bore of the driveshaft with the rotor and/or stator. The rotor may thus be cooled and the fluid can be further centrifuged toward the stator and the stator end-windings, which are thus also cooled. Furthermore, the hydraulic stator path can include a branched-off jacket line to a jacket cooling structure of the electric machine arranged in the housing thereof. Thus, the jacket of the electric machine may be cooled with the same fluid used for cooling the interior portions of the electric drive; a separate water cooling is thus not necessary.

In any of the above embodiments, the housing of the electric drive may include an intermediate wall which separates the inner space into a motor-side chamber and a transmission-side chamber. A through-opening can be arranged in the intermediate wall through which fluid can flow from the transmission-side reservoir to the motor-side reservoir. As mentioned above, in the low speed mode, the transmission may be supplied with fluid passively from the sump, wherein the fluid level in the transmission-side reservoir can be higher in the low speed mode than in the high speed mode.

BRIEF DESCRIPTION OF THE DRAWINGS

Exemplary embodiments and further advantages of the electric drive for a motor vehicle will be explained as follows with reference to the accompanying drawings.

FIG. 5 shows various operating modes in tabular form.

DETAILED DESCRIPTION

Figure 1A:
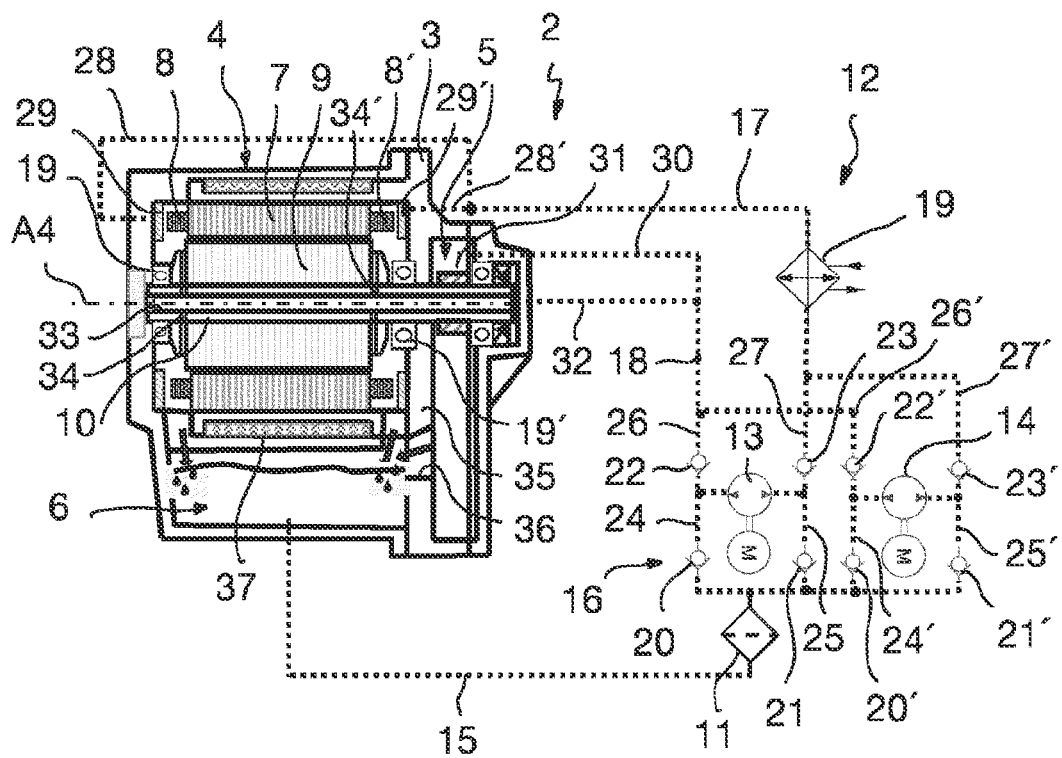
FIG. 1A shows a schematic illustration of a first exemplary embodiment of an electric drive.
Figure 1B:
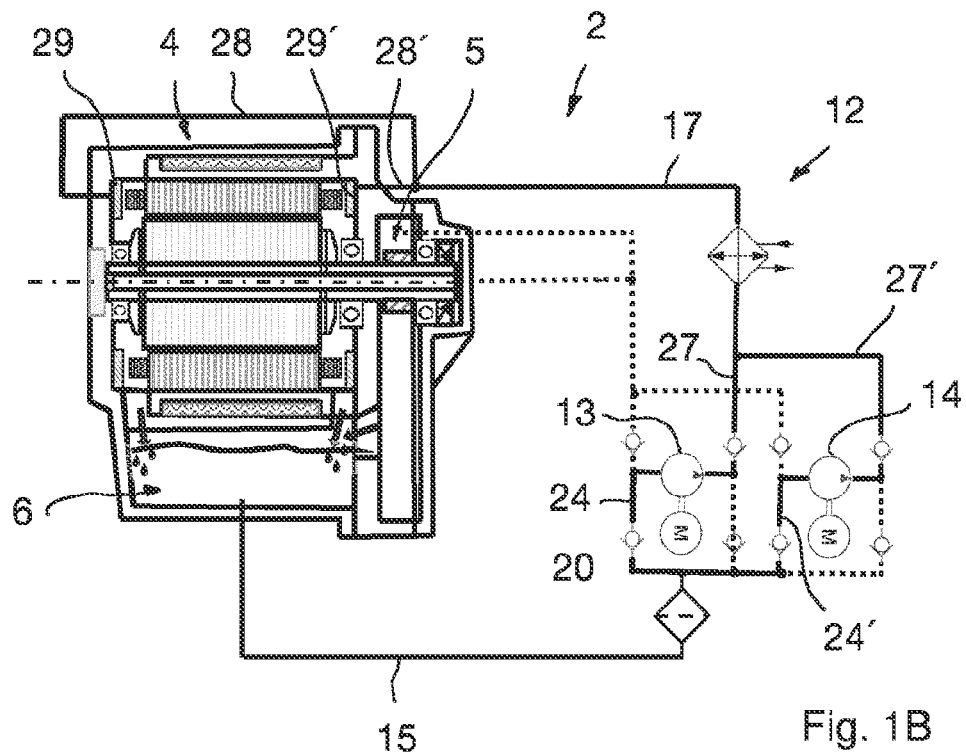
FIG. 1B shows the embodiment of FIG. 1A in a low speed mode.

FIGS. 1A to 1D, collectively referred to as FIG. 1, show an electric drive 2 in a first embodiment. The electric drive 2 comprises a housing 3, an electric machine 4, a transmission 5, and a sump 6, which are shown as a schematic representation of a longitudinal section along a rotary axis A4 of the electric machine 4. The electric machine 4 has a stator 7 connected to the housing 3 and including stator end-windings 8, and a rotor 9 being rotatable relative to the stator 7. A driveshaft 10 is connected to the rotor 9 and rotatably supported in the housing 3 about the axis of rotation A4 by means of bearings 19, 19'. The transmission 5 is adapted to transmit a rotary movement from the driveshaft 10 to drive a driveline of the vehicle, which is not depicted. The transmission 5 may comprise, for example, at least one of a reduction gearing, a differential gearing and a coupling, which are not depicted.

A hydraulic arrangement 12 is schematically depicted, comprising a first bi-directional pump 13 and a second bi-directional pump 14, that are both hydraulically connected to the sump 6 via a fluid supply line 15, a valve arrangement 16 with multiple valves, a hydraulic stator path 17 connecting each of the two pumps 13, 14 with a portion of the electric machine 4 to supply fluid to the stator 7, and a hydraulic transmission path 18 connecting each of the two pumps 13, 14 with a portion of the transmission 3 for cooling same. Thus, the hydraulic arrangement 12 can also be referred to as hydraulic circuit or cooling arrangement.

The valves 20, 21, 22, 23; 20', 21', 22', 23' are configured and/or arranged such that, depending on the direction of rotation of the respective bi-directional pump 13, 14 fluid is either supplied from the sump 6 through a first suction line 24, 24' to the stator path 17 to cool the electric machine 4, or fluid is supplied from the sump 6 through the second suction line 25, 25' to the transmission path 18 to cool parts of the transmission 5. At least some of the valves 20, 21, 22, 23; 20', 21', 22', 23' may be configured as check valves, without being restricted thereto.

In the following, the hydraulic arrangement is described with respect to the first pump 13. A first valve 20 is arranged in the first suction line 24, a second valve 21 is arranged in the second suction line 25, a third valve 22 is arranged in a first pressure line 26 that is part of the transmission path 18, and a fourth valve 23 is arranged in a second pressure line 27 that is part of the stator path 17. The first suction line 24 is connected to a first inlet, and the second suction line 25 is connected to a second inlet of the pump 13. The hydraulic arrangement of the second pump 14 is arranged functionally parallel and configured analogous to that of the first pump 13, the description of which is hereby referred to with the respective reference numbers of the lines and valves being provided with indices. A suction filter 11 is arranged in the fluid supply line 15. A heat exchanger 19 is arranged downstream of the pumps 13, 14 in the stator path 17.

The stator path 17 splits up into a first branch 28 for supplying a first stator cooling unit 29 with fluid, and a second branch 28' for supplying the opposite second stator cooling unit 29' with fluid. The cooling units 29, 29' may respectively comprise a ring channel, and a plurality of circumferentially distributed cooling nozzles directed towards the respective first and second stator end windings 8, 8'. When the hydraulic arrangement is operated to supply fluid to the stator path 17, active cooling of the stator 7, in particular the stator end-windings 8, 8', is achieved with high cooling effect.

The hydraulic transmission path 18 includes a branch 30 to inner portions of the transmission 5 which may, for example, include a transmission reservoir 31 arranged at a higher level than the sump 6. Thus, fluid supplied to the transmission reservoir 31 may flow or drip, due to gravity, to rotating parts of the transmission, such as gears and bearings to cool and/or lubricate same. The fluid is then gathered in the sump 6 and can be circulated again by the pumps. The transmission path 18 further includes a branch 32 to an inner longitudinal bore 33 of the driveshaft 10. Thus, when the electric drive 2 is operated in a high speed mode with the fluid being supplied primarily to the transmission 5, the electric machine 4 is supplied with low-pressure cooling fluid via the driveshaft 10. For this, the driveshaft 10 is configured as a hollow shaft having radial bores 34, 34' connected with the longitudinal bore 33. Parts of the rotor 9 may thus be cooled and the fluid can be centrifuged radially outwards towards the stator 7, in particular toward the stator end-windings 8, 8'. Thus, when the hydraulic arrangement is operated to supply fluid to the transmission 5, the electric machine 4 is cooled passively at the same time.

In the embodiment shown in FIG. 1 including two bi-directional pumps 13, 14, the hydraulic arrangement 12 can be controlled in different modes of operations. In a low speed/high torque mode, both, the first and the second bi-directional pumps 13, 14, can be driven to supply fluid from the sump 6 through the fluid supply line 15, suction lines 24, 24', and pressure lines 27, 27' through the stator path 17 for cooling the electric machine 4. The fluid supply of the low speed/high torque mode is shown in FIG. 1B with a continuous line. Both pumps 13, 14 are driven in the same direction of rotation, for example clockwise.

Figure 1C:
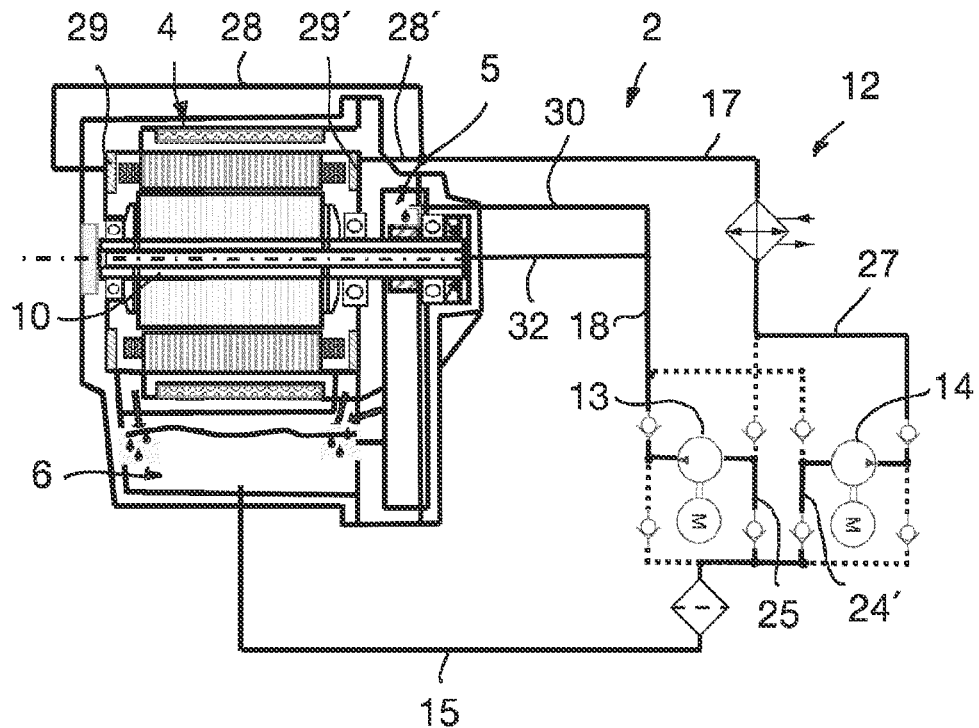
FIG. 1C shows the embodiment of FIG. 1A in a medium speed mode.

In a medium speed/medium torque mode, the bi-directional pump 14 is driven to supply fluid from the sump 6 to the stator path 17, whereas the other pump 13 is driven to supply fluid from the sump 6 to the transmission path 18. The fluid flow of the medium speed/medium torque mode is shown in FIG. 1C with a continuous line. The pumps 13, 14 are driven in opposite directions of rotation, i.e., one clockwise and the other one counter clockwise.

Figure 1D:
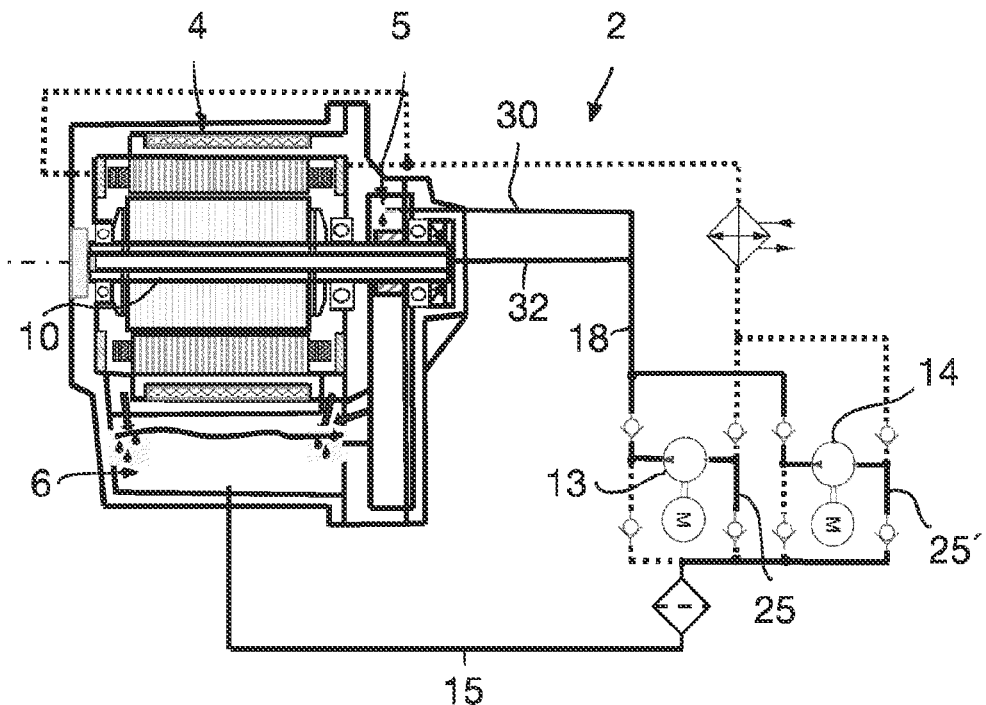
FIG. 1D shows the embodiment of FIG. 1A in a high speed mode.

In a high speed/low torque mode, both bi-directional pumps 13, 14 are driven to supply fluid from the sump 6 to the transmission path 18. The fluid flow of the high speed/low torque mode is shown in FIG. 1D with a continuous line. Both pumps 13, 14 are driven in the same direction of rotation, for example counter clockwise.

In the embodiment shown in FIG. 1, the electric drive 2 includes a joint sump 6 in which fluid of the electric machine 4 and the transmission 5 is gathered, i.e., the respective first suction lines 24, 24' and second suction lines 25, 25' of both bi-directional pumps 13, 14 are hydraulically connected with the joint sump 6 through one single fluid supply line 15 connected to the single sump 6.

As an option, the housing 3 of the electric drive 2 may include an intermediate wall 35 which separates the housing inner space into a motor-side chamber and a transmission-side chamber. A through-opening 36 is provided in the intermediate wall 35 through which fluid can flow from the transmission-side reservoir to the motor-side reservoir, or vice versa, depending on the respective fluid level.

Furthermore, the housing 3 may optionally comprise a jacket cooling 37 for the electric machine 4. The jacket cooling 37 can comprise a cooling structure extending circumferentially around the stator 7 to cool same. The cooling structure can have, for example one or more meander-like channels through which a cooling fluid, in particular a water-based coolant can flow to absorb heat generated by the stator.

Figure 2:
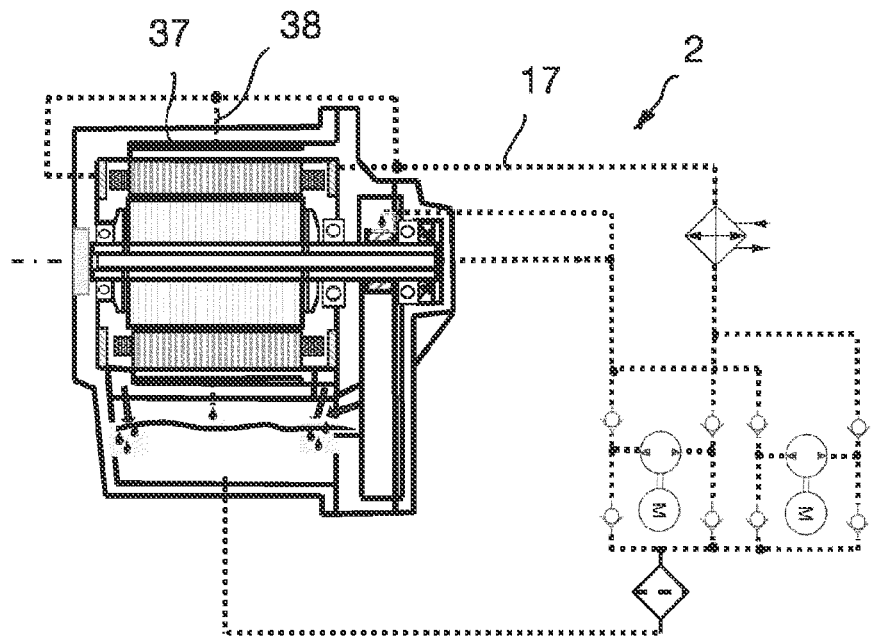
FIG. 2 shows a schematic illustration of a modified embodiment of an electric drive.

FIG. 2 shows an electric drive 2 in a modified embodiment. The embodiment of FIG. 2 widely corresponds to the one shown in FIG. 1 so that with regard to common features reference is made to the above description. The only difference of the embodiment shown in FIG. 2 is that the same fluid is used for the jacket cooling structure 37 as for the inner parts of the electric drive 2. For this, the hydraulic stator path 17 includes a branched-off jacket line 38 connected with the jacket cooling structure 27 of the electric machine 4 arranged in the housing 3 thereof.

FIGS. 3A to 3D, collectively referred to as FIG. 3, show an electric drive 2 in another embodiment. The embodiment of FIG. 3 widely corresponds to the embodiment shown in FIG. 1 so that with regard to common features reference is made to the above description. In this regard, the same details have been given the same reference numbers as in FIG. 1.

The present example comprises two bi-directional pumps 13, 14 and a sump 6 comprising two separate reservoirs, i.e., a motor-side reservoir 39 and a transmission-side reservoir 40. In this case, the first suction lines 24, 24' of both bi-directional pumps 13, 14 are hydraulically connected with the motor-side reservoir 39 and, accordingly, the second suction lines 25, 25' of both pumps 13, 14 are hydraulically connected with the transmission-side reservoir 40. The motor sump line 15 is hydraulically connected with the first suction line 24 connected to a first suction side inlet of the first bi-directional pump 13, and motor sump line 15 is hydraulically connected with a first suction line 24' connected to a respective first inlet of the second pump 14. Accordingly, a transmission sump line 41 is hydraulically connected with the second suction line 25 connected to a second inlet of the first pump 13, and with the second suction line 25' connected to a second inlet of the second pump 14.

Figure 3A:
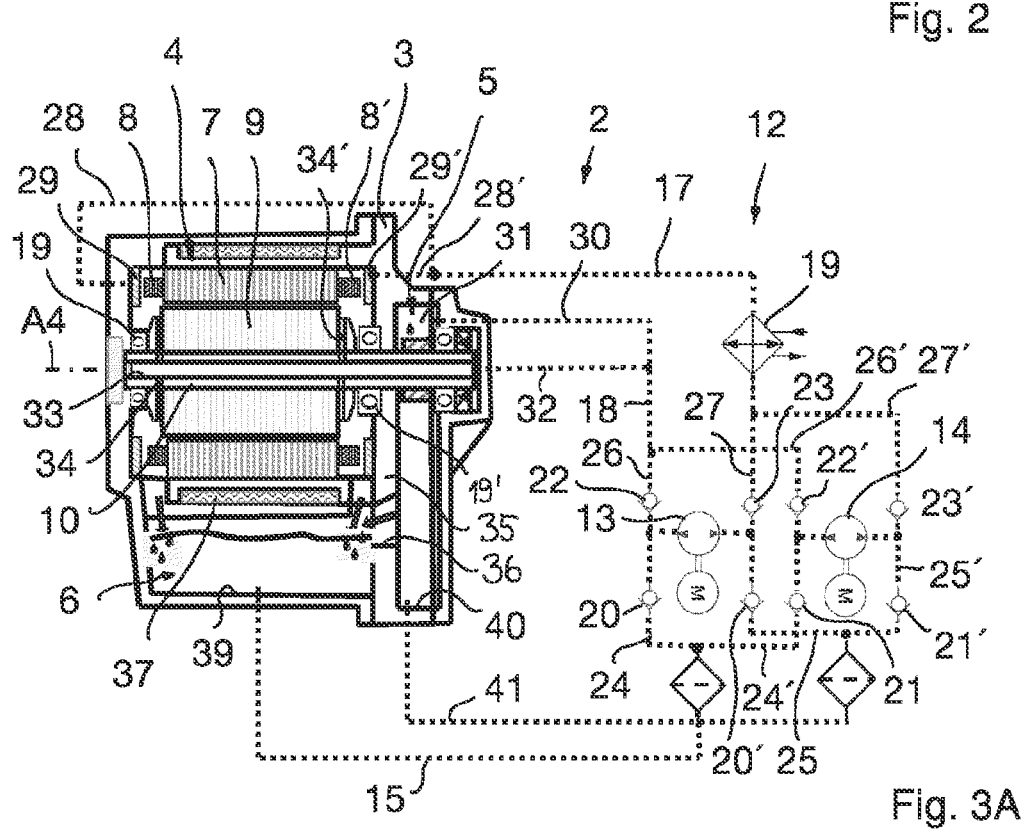
FIG. 3A shows a schematic illustration of another exemplary embodiment of an electric drive.
Figure 3B:
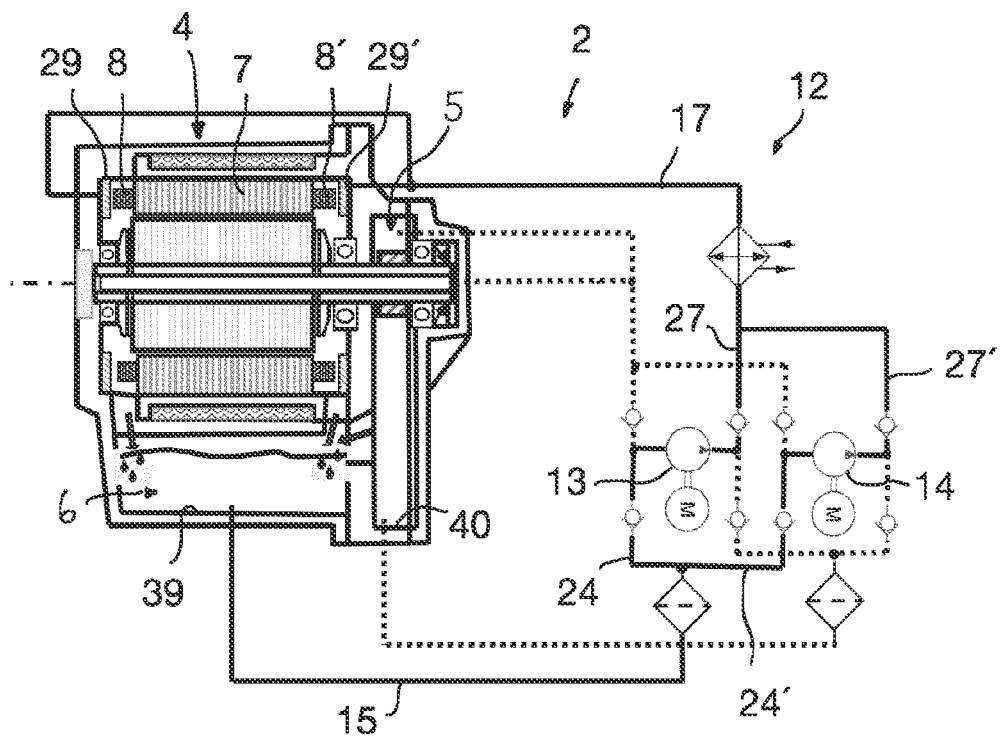
FIG. 3B shows the embodiment of FIG. 3A in a low speed mode.

In a low speed/high torque mode, with the respective fluid flow shown as continuous line in FIG. 3B, both pumps 13, 14 can be driven to feed fluid from the motor-side reservoir 39 through the motor sump line 15 to the cooling units 29, 29' mainly for cooling the stator 7 and/or winding heads 8, 8' of the electric machine 4. Taking the fluid from the motor reservoir 39 can lead to an increased fluid level in the transmission reservoir 40, allowing more plunging of the transmission 5. In this mode, the transmission 5 is operating with passive lubrication.

Figure 3C:
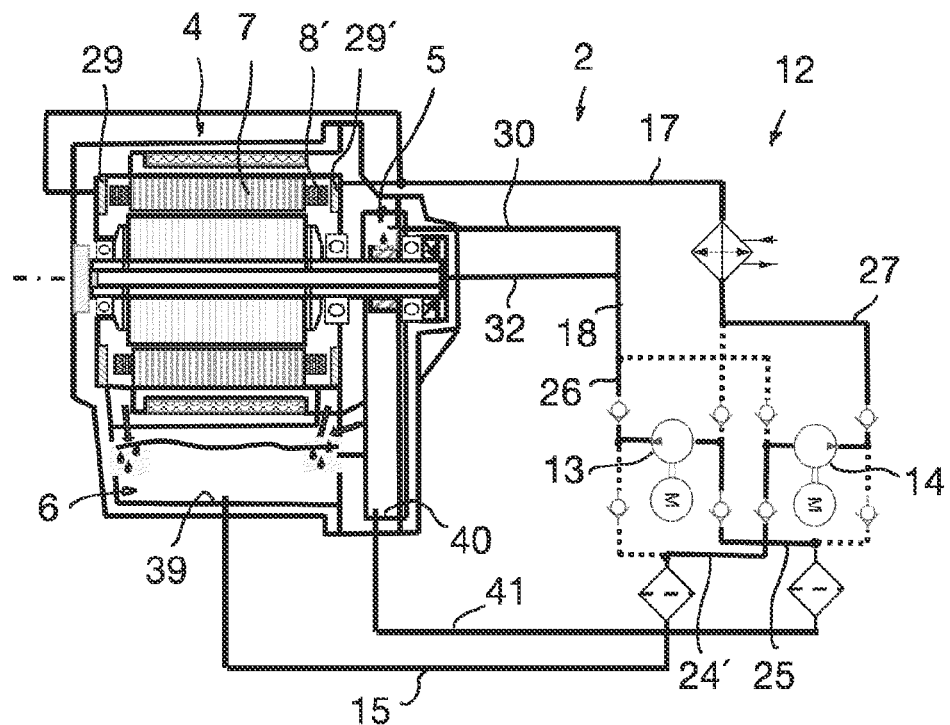
FIG. 3C shows the embodiment of FIG. 3A in a medium speed mode.

In medium speed/medium torque mode, with the respective fluid flow shown as continuous line in FIG. 3C, the two pumps may operate functionally opposite to each other, i.e., with the pump 13 sucking fluid from the transmission reservoir 40 through the line 41 and feeding same mainly to the transmission 5 for cooling same, and the pump 14 sucking fluid from the motor reservoir 39 through line 15 and feeding same to the cooling units 29, 29' for mainly cooling the stator 7 and/or rotor 9 of the electric machine 4. Taking fluid from the transmission reservoir 40 will reduce the fluid level here, hence the plunging of the gears is reduced. In this mode the transmission 5 is actively lubricated to reduce churning losses for high efficiency.

Figure 3D:
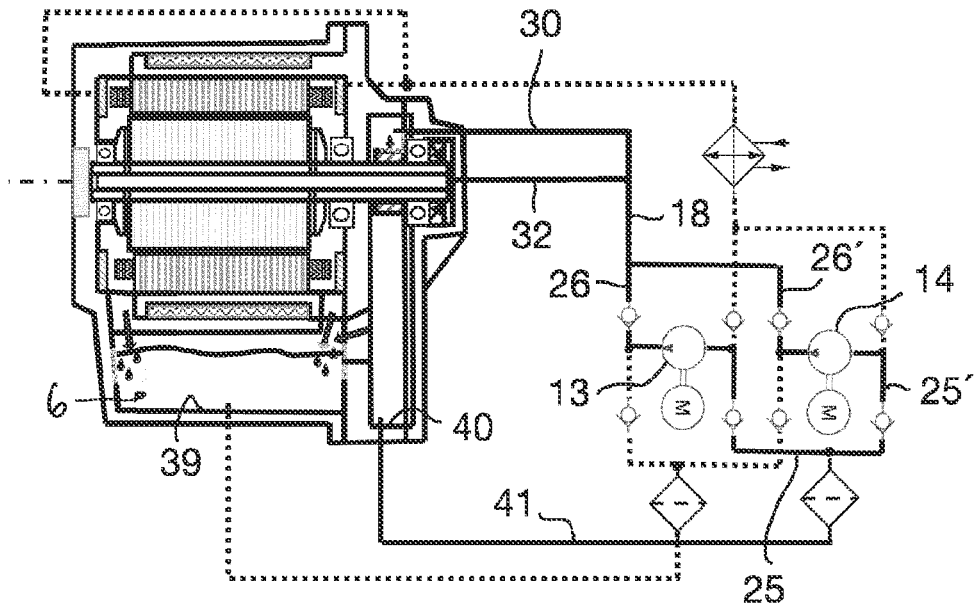
FIG. 3D shows the embodiment of FIG. 3A in a high speed mode.

In a high speed/low torque mode, with the respective fluid flow shown as a continuous line in FIG. 3D, both pumps 13, 14 can be driven so as to feed fluid from the transmission reservoir 40 through lines 41, 24, 25', 26, 26', 18, 30, 32 to one or more portions of the transmission 5. Taking the fluid of both pumps 13, 14 from the transmission reservoir 40 may lead to a reduced fluid level in the transmission reservoir 40, thus achieving little plunging and thus only small losses of the transmission 5.

Figure 4A:
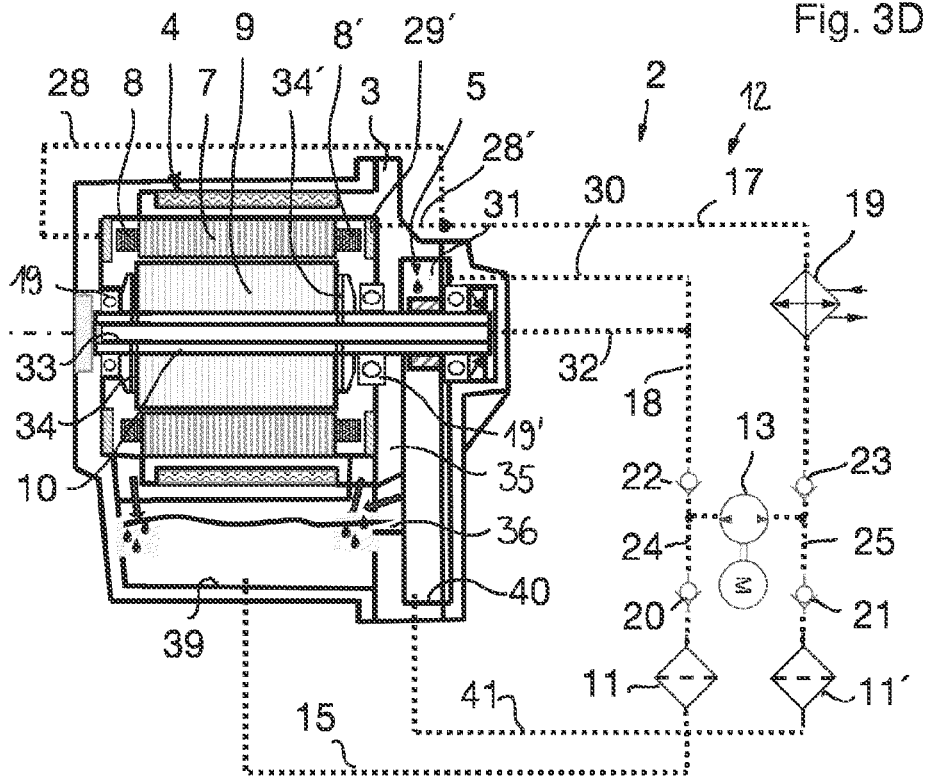
FIG. 4A shows a schematic illustration of another exemplary embodiment of an electric drive.
Figure 4B:
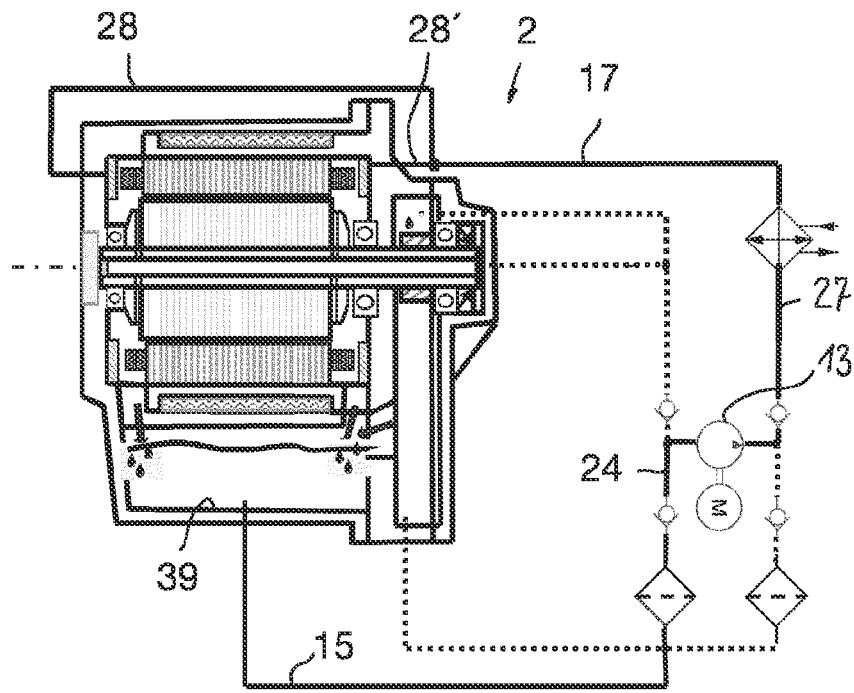
FIG. 4B shows the embodiment of FIG. 4A in a low speed mode.
Figure 4C:
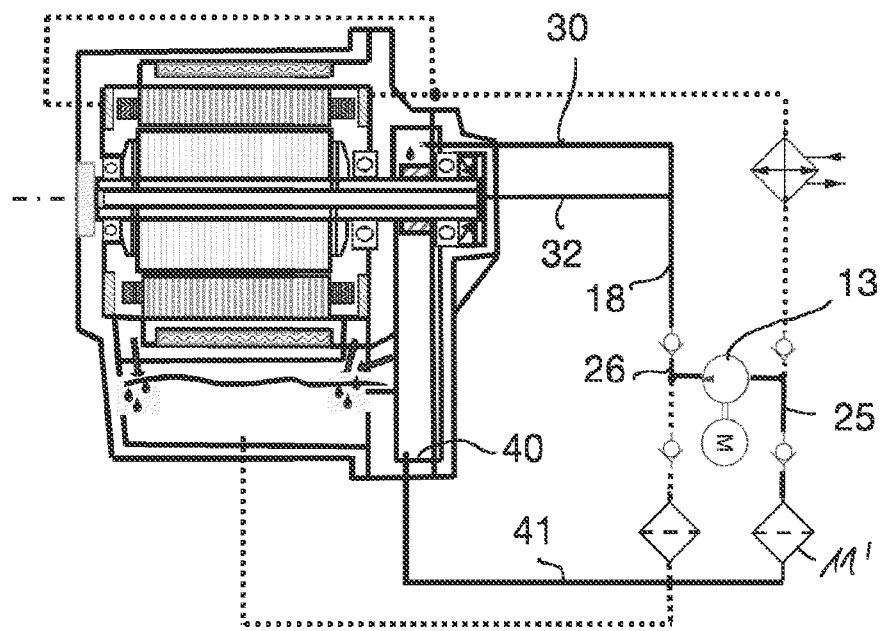
FIG. 4C shows the embodiment of FIG. 4A in a high speed mode.

FIGS. 4A to 4C, collectively referred to as FIG. 4, show an electric drive 2 in another embodiment. The embodiment of FIG. 4 widely corresponds to the embodiment shown in FIG. 3 so that with regard to common features reference is made to the above description. In this regard, the same details have been given the same reference numbers as in FIGS. 3, 2 and 1, respectively.

The present embodiment shown in FIG. 4 is characterized in that only one bi-directional pump 13 is provided, with the sump 6 including two separate reservoirs, i.e., a motor-side reservoir 39 and a transmission-side reservoir 40. The first suction line 24 of the bi-directional pump 13 is hydraulically connected with the motor-side reservoir 39 and the second suction line 25 of the pump 13 is hydraulically connected with the transmission reservoir 40.

In this embodiment, the hydraulic arrangement 12 can be controlled such that in a low speed mode, the bi-directional pump 13 is driven to supply fluid from the motor-side reservoir 39 to the stator path 17 for mainly cooling the electric machine 4. The flow path of this mode is shown as continuous line in FIG. 4B. In a high speed/low torque mode the bi-directional pump 13 is driven so as to supply fluid from the transmission-side reservoir 40 to the transmission path 18 mainly for cooling the transmission 5. The flow path of this high speed mode is shown as continuous line in FIG. 4C.

Exemplary operation modes for an electric drive 2 with two bi-directional pumps 13, 14, such as shown in any of FIGS. 1 to 3, is depicted schematically in FIG. 5. Here, P1 relates to a first pump, P2 to a second pump, CS to the cooling system, MD to the mode, and OP to the operation of the electric drive 2.

At low power operation (Olp) of the electric drive 2, the first and second pump (P1, P2) can be switched off (0), so that the cooling systems works with passive lubrication only (C0), i.e., no active oil cooling. The system works in energy saving mode (Ms).

In a high torque at lower speed operation (Ot) of the electric drive 2, the first and second pump (P1, P2) are both switched on and driven in the same rotary direction (rd1), for example clockwise, so that the cooling system generates a maximum fluid supply to the electric motor 4 (Cm), more particularly to the cooling units 29, 29' for mainly cooling the stator end windings 8, 8'. This mode is characterized by maximum torque, depicted as Mt. The transmission of the electric drive is passively lubricated and/or cooled, i.e., no active rotor cooling, at a high fluid level in the transmission.

In a medium torque and medium speed operation (Omed) of the electric drive 2, the first and second pump (P1, P2) are both switched on so as to be driven in opposite rotary directions (rd1, rd2) so that the cooling system generates a medium fluid supply to the electric motor 4 and transmission 5 (Cmed). This mode may be referred to as transition mode, shown as Mmed. Thus, a low flow spray cooling is combined with a limited rotor cooling and active transmission lubrication, with a lower transmission oil level being possible.

In a high speed operation (Ov) of the electric drive 2, the first and second pump (P1, P2) are both switched on so as to be driven in the same rotary direction (rd2), for example counter clockwise, so that the cooling system generates a maximum fluid supply to the transmission 5 and rotor 9 (Ct). This mode may be referred to as high speed mode, depicted as Mv. Thus, an active transmission lubrication and cooling of the winding heads through centrifuged oil from the rotor is provided, with a lower transmission oil level being possible.

The operation of the hydraulic arrangement may be controlled according to the operation mode of the electric machine. At low speed and high torque copper losses are high, hence cooling the staptor and the end winding is important. At low torque and high speed eddy current losses in the lamination and the magnets increase significantly. In such condition cooling the magnets and the rotor and stator lamination need particular attention. Transmission lubrication again should be adjusted to the operation conditions. At high torque and low speed, a passive lubrication may be sufficient. At high speed and low torque oil flow can be reduced and focused to minimize churning losses using active lubrication.

REFERENCE SIGNS 2 electric drive
3 housing
4 electric machine
5 transmission
6 sump
7 stator
8, 8' stator end-windings
9 rotor
10 driveshaft
11, 11' suction filter
12 hydraulic arrangement
13 bi-directional pump
14 bi-directional pump
15 fluid supply line
16 valve arrangement
17 stator path
18 transmission path
19 heat exchanger
20 valve 20, 20'
21, 21' valve
22, 22' valve
23, 23' valve
24, 24' suction line
25, 25' suction line
26, 26' pressure line
27, 27' pressure line
28, 28' branch
29, 29' cooling unit
30 branch
31 transmission reservoir
32 branch
33 longitudinal bore
34, 34' radial bore
35 intermediate wall
36 through-opening
37 jacket cooling structure
38 jacket line
39 sump
40 sump
A axis

The invention claimed is:

1. Electric drive for a vehicle, comprising:
a housing,
an electric machine with a stator connected to the housing and comprising stator end-windings, a rotor rotatable relative to the stator, and a driveshaft connected to the rotor in a rotationally fixed manner, wherein the driveshaft is supported in the housing so as to be rotatable about an axis of rotation,
a transmission for transmitting a rotary movement from the driveshaft to a driveline of the motor vehicle,
a sump with fluid for cooling and/or lubricating at least one of the electric machine and the transmission,
a hydraulic arrangement comprising at least one bi-directional pump, a first suction line arranged between the sump and the pump, a stator path arranged between the pump and the electric machine to supply fluid for cooling the stator, a second suction line arranged between the sump and the pump, and a transmission path arranged between the pump and the transmission to supply fluid for cooling the transmission, and
a valve arrangement with multiple valves configured such that, depending on the direction of rotation of the bi-directional pump fluid is either supplied from the sump through the first suction line to the stator path to cool the electric machine, or fluid is supplied from the sump through the second suction line to the transmission path to cool the transmission.

2. The electric drive according to claim 1, wherein the valve arrangement comprises a first check valve arranged in the first suction line, a second check valve arranged in the second suction line, a third check valve arranged in a first pressure line that is part of the transmission path, and a fourth check valve arranged in a second pressure line that is part of the stator path.

3. The electric drive according to claim 1, wherein the hydraulic arrangement comprises a first bi-directional pump and a second bi-directional pump that are hydraulically arranged in parallel between the sump at a suction side, and the electric machine and the transmission at a pressure side.

4. The electric drive according to claim 3,
wherein the hydraulic arrangement is controllable such that at least one of:
in a low speed mode both the first bi-directional pump and the second bi-directional pump are driven so as to supply fluid from the sump to the stator path to cool the electric machine,
in a medium speed mode, one of the first and second bi-directional pump is driven so as to supply fluid from the sump to the stator path to cool the electric machine, and the other one of the first and second bi-directional pump is driven so as to supply fluid from the sump to the transmission path to cool the transmission, and
in a high speed mode both the first bi-directional pump and the second bi-directional pump are driven so as to supply fluid from the sump to the transmission path to cool the transmission.

5. The electric drive according to claim 1,
wherein the sump is configured as a joint sump in which fluid of the electric machine and the transmission is contained, with only one sump line hydraulically connected thereto, and
wherein the first suction line and second suction line of both the first bi-directional pump and the second bi-directional pump are hydraulically connected with said joint sump through said sump line.

6. The electric drive according to claim 3,
wherein the sump comprises a motor-side reservoir associated with the electric machine and a transmission-side reservoir associated with the transmission,
wherein the first suction lines of both the first bi-directional pump and the second bi-directional pump are hydraulically connected with the motor-side reservoir, and
wherein the second suction lines of both the first bi-directional pump and the second bi-directional pump are hydraulically connected with the transmission.

7. The electric drive according to claim 6,
wherein a motor sump line is hydraulically connected with the first suction line of the first bi-directional pump and with the first suction line of the second bi-directional pump, and
wherein a transmission sump line is hydraulically connected with the second suction line of the first bi-directional pump and with the second suction line of the second bi-directional pump.

8. The electric drive according to claim 6,
wherein the hydraulic arrangement is controllable such that:
in a low speed mode both the first bi-directional pump and the second bi-directional pump are driven so as to supply fluid from the motor-side reservoir to the stator path to cool the electric machine,
in a medium speed mode, the first bi-directional pump is driven so as to supply fluid from the transmission-side reservoir to the transmission path for cooling the transmission, and the second bi-directional pump is driven so as to supply fluid the motor-side reservoir to the stator path for cooling the electric machine, and
in a high speed mode both the first bi-directional pump and the second bi-directional pump are driven so as to supply fluid from the transmission-side reservoir to the transmission path for cooling the transmission.

9. The electric drive according to claim 1,
wherein the hydraulic arrangement comprises only one bi-directional pump and
wherein the sump comprises a motor-side reservoir associated with the electric machine and a transmission-side reservoir associated with the transmission, and
wherein the first suction line of the bi-directional pump is hydraulically connected with the motor-side reservoir, and the second suction line of the bi-directional pump is hydraulically connected with the transmission-side reservoir.

10. The electric drive according to claim 9, wherein the hydraulic arrangement is controllable such that:
in a low speed mode the bi-directional pump is driven so as to supply fluid from the motor-side reservoir to the stator path for mainly cooling the electric machine, and
in a high speed mode the bi-directional pump is driven so as to supply fluid from the transmission-side reservoir to the transmission path for mainly cooling the transmission.

11. The electric drive according to claim 4,
wherein, in the low speed mode, the transmission is supplied with fluid passively from the sump, and
wherein a fluid level in the transmission-side reservoir can be higher in the low speed mode than in the high speed mode.

12. The electric drive according to claim 1, wherein the hydraulic stator path comprises a branched-off jacket line to a jacket cooling structure of the electric machine arranged in the housing.

13. The electric drive according to claim 4, wherein the hydraulic transmission path comprises a branched-off shaft line to an inner longitudinal bore of the driveshaft.

14. The electric drive according to claim 13, wherein, in the high speed mode, the electric machine is supplied with fluid via radial bores of the driveshaft connecting the inner longitudinal bore with at least one of the rotor and the stator of the electric machine.

15. The electric drive according to claim 1, wherein the housing includes an intermediate wall which separates an inner space into a motor-side chamber and a transmission-side chamber, wherein a through-opening is arranged in the intermediate wall through which fluid can flow from the transmission-side reservoir to the motor-side reservoir.

16. The electric drive according to claim 1, wherein a heat exchanger is arranged in the stator path.

* * * * *